United States Patent [19]
Guillo et al.

[11] Patent Number: 6,008,152
[45] Date of Patent: Dec. 28, 1999

[54] REFRACTORY MATERIAL OF VITREOUS SILICA

[75] Inventors: Philippe Guillo, Paris, France; Mike Hankin, Ayr, United Kingdom

[73] Assignee: Vesuvius Crucible Company, Pittsburgh, Pa.

[21] Appl. No.: 09/011,209

[22] PCT Filed: Jul. 24, 1996

[86] PCT No.: PCT/EP96/03318

§ 371 Date: May 14, 1998

§ 102(e) Date: May 14, 1998

[87] PCT Pub. No.: WO97/05076

PCT Pub. Date: Feb. 13, 1997

[30] Foreign Application Priority Data

Jul. 31, 1995 [FR] France .................................. 95 09404

[51] Int. Cl.⁶ .................................................. C04B 35/14
[52] U.S. Cl. ............................. 501/54; 501/133; 75/301; 222/566; 222/591; 266/236; 266/275; 266/280; 266/287

[58] Field of Search .................................. 501/17, 32, 54, 501/55, 69, 133, 154; 75/301; 222/591, 475.1, 566; 266/236, 280, 275, 287

[56] References Cited

U.S. PATENT DOCUMENTS 5,340,782  8/1994  Langenohl .............................. 501/133

*Primary Examiner*—Paul Marcantoni
*Attorney, Agent, or Firm*—Webb Ziesenheim Logsdon Orkin & Hanson, P.C.

[57] ABSTRACT

The invention concerns a refractory material comprised essentially of vitreous or amorphous silica and presenting an improved resistance to corrosion by molten metals, principally aluminium. It contains at least 0.1% and no more than 10% by wt. of barium sulfate. It has a crystallized silica content of less than 10% and it is comprised of at least 75% vitreous or amorphous silica.

7 Claims, No Drawings

REFRACTORY MATERIAL OF VITREOUS SILICA

BACKGROUND OF THE INVENTION

Sintered vitreous silica is a refractory material obtained by sintering amorphous silica powder that has physical and chemical characteristics that make its application of particular interest for numerous industrial uses, notably for the metallurgy of nonferrous metals such as aluminium, zinc, brass, etc.

In effect, this material has a very low coefficient of thermal conductivity (0.7 W/m.K at 700° C.). This characteristic offers significant advantages. When the refractory element is used for the transport or transfer of a molten metal, the heat losses by conduction through the wall of the receptacle or the transfer tube are reduced to the minimum possible. Thus, it is not necessary to overheat the metal (i.e., heat is to a temperature higher than its melting point) to a considerable degree. This results in energy savings.

On the other hand, vitreous silica has a very low coefficient of thermal expansion (0.6×10–6 m/K) when the product contains no crystalline phases. This low thermal expansion gives it an excellent resistance to thermal shocks. This makes it possible in most applications to use or to install a refractory element of vitreous silica without having to preheat it beforehand to bring it to a temperature close to its operating temperature. This results in a time gain and also an energy saving. This low thermal expansion permits thermal cycling a large number of times without mechanically fatiguing the material. It also assures a dimensional stability of the product with respect to temperature.

Furthermore, vitreous silica offers a good chemical stability with respect to almost all the materials of molten metals and alloys.

This is why, among other applications, this material is used in nonferrous metallurgy. For example, low-pressure foundry installations are known, in which a mold is fed with metal through its lower part via a tube dipping into a vat filled with molten metal. The pressure of a pulsating gas, e.g., nitrogen or other neutral gas, is applied to the surface of the molten metal to cause it to rise into the mold. Vitreous silica is perfectly suited for the material of the dipping tube.

However, vitreous silica is corroded under the action of a metal that has a greater affinity relative to oxygen. This is the case, for example, of aluminium brought to its melting point or a higher temperature. This metal reduces silica to form a deposit of alumina, leaving metallic silicon. After a period of time that is a function of the thickness of the refractory element, this corrosion ends in the cracking or rupture of the said element. This phenomenon is observed for all applications where the vitreous silica refractory is in contact with the molten aluminium.

A refractory composition resistant to molten aluminium has also been disclosed (U.S. Pat. No. 4,992,395). This composition includes 10–18 wt % ceramic fiber. By ceramic fiber it is meant amorphous or non-crystalline fiber composed of 50% alumina and 50% silica. Such a two phase material is essentially an insulating material suitable for making coatings. Its insulating properties are obtained by the low packing density caused by the fibers during the shaping process. This leads to a porosity of at least 20% which results in the insulating properties of the material. However, such a material does not have enough mechanical resistance to make structural pieces out of it, that is pieces having a mechanical resistance by themselves, and not simply to form the coating of another structure.

SUMMARY OF THE INVENTION

The precise object of the present invention is a material comprised basically of vitreous silica, notably for use in nonferrous metallurgy, particularly aluminium, which remedies this shortcoming.

This refractory material is characterized in that it contains at least 0.1% and no more than 10% by wt. of barium sulfate.

The presence of barium sulfate substantially reduces the wettability of molten metals on this refractory. Furthermore, it is compatible with the shaping process of the refractory, which for example can be slip casting or injection molding: pouring in the form of slips utilizes the suspension in water of vitreous silica powder finely ground in water. The additive should be insoluble in water. With regard to thermoplastic injection molding, the additive should have an adapted granulometry so as not to affect the injectability properties.

The vitreous silica products, once shaped, are densified by sintering at temperatures above 1000° C. This densification corresponds to a decrease in viscosity of the vitreous silica. Barium sulfate has a good temperature stability.

In effect, barium sulfate is a stable, refractory compound compatible with the densification temperatures of vitreous silica and furthermore it does not dissolve in water. It is widely available in the natural state in the form of barite and the various granulometric sizes available are compatible with the shaping processes envisioned.

The barium sulfate content depends on the contemplated application and the forming process. The higher it is, the more the corrosion phenomena in aluminium are reduced. On the other hand, high barium sulfate contents diminish the mechanical properties and the resistance to thermal shocks due to the increasing proportion of crystallized silica in the finished product.

The incorporation of barium sulfate in the fused silica product takes into account the forming process used and modifies the densification conditions of the products formed.

The refractory material preferably has a content of crystallized silica less than 10%.

This low proportion of crystallized silica permits preservation of the good properties of resistance to thermal shock of molten silica products.

The refractory material is also preferably comprised of at least 75% vitreous of amorphous silica.

According to another embodiment, the refractory material has a porosity of at least 30% and at most 80%.

The invention also concerns an article which is characterized in that it is comprised of a refractory material as described above, as well as an article that has an exterior surface coated with this refractory material over a thickness of more than 2 mm.

The invention concerns a manufacturing process for an article characterized in that a slip is prepared, and a slip of barium sulfate, in that these two slips are mixed and that the mixture is cast into a mold.

The invention concerns a process for manufacturing an article, characterized in that silica grains and barium sulfate grains are mixed, that a slip is prepared, that a slip of this mixture is prepared and that the said slip is cast into a mold.

Finally, the invention concerns a process for manufacturing an article, characterized in that silica grains and barium sulfate grains are mixed with organic binders to obtain a thermoplastic paste that is injected into a mold.

A foaming agent may further be added to increase the porosity.

DETAILED DESCRIPTION OF THE INVENTION

Other characteristics and advantages of the invention will appear in reading the examples given below purely for illustrative purposes.

EXAMPLE 1

A tube was produced for feeding a low-pressure casting mold for aluminium and its alloys. The new product was produced by mixing a slip of vitreous silica and a slip of barium sulfate. The two slips had essentially the same characteristics of density, grain size and fluidity. The barium sulfate slip represented 5% of the total mixture cast. The mixture was poured into a plaster mold and then dried. The new product was fired at a temperature above 1050° C. The material had a porosity of 12%, a density of 1.93 g/cm$^3$ and a MOR of 2000 PSI (cold MOR in flexion). Results: the service life of the tube was multiplied at least by three relative to that of a traditional tube of pure vitreous silica produced by pouring a slip.

EXAMPLE 2

A pouring tube was produced, also for aluminium and its alloys. This tube was produced of vitreous silica by an injection molding process. This process consists of mixing dry powders of a specific granulometry with binders comprised of thermoplastic organic materials. Injection and then cooling of the mold permit obtaining articles of a form that will be subsequently debonded and then baked. The incorporation of a barium sulfate powder with a granulometry identical to that of conventional silica powder made it possible to obtain tubes containing 5% by wt. of barium sulfate. The reduction in the melting point made it possible to preserve the mechanical properties of the products while limiting the portion of crystallized silica to less than 5%.

Results: the service life of the tube was multiplied by four relative to that of a conventional tube of pure vitreous silica produced by pouring a slip.

EXAMPLE 3

A runner for transferring molten aluminium was produced by mixing a slip of vitreous silica and a slip of barium sulfate representing 5% of the total mixture cast. The mixture was poured into a plaster mold, dried and fired at a temperature of 1050° C. or higher.

The product had a porosity of 50%, a density of 1.1 g/cm$^3$, and a MOR of 700 PSI. The thermal conductivity was less than 0.5 W/m.K at 700° C. The service life was multiplied by two with respect to a similar runner made of foamed silica.

We claim:

1. A refractory material having an improved resistance to corrosion by a molten metal that has an affinity relative to oxygen greater than that of silica, comprising vitreous silica and at least 0.1% and no more than 10% by weight of barium sulfate.

2. The refractory material according to claim 1, including a crystallized silica content of less than 10% by weight.

3. The refractory material according to claim 1, comprising at least 75% by weight vitreous silica.

4. The refractory material according to claim 1, having a porosity of between 30% to 80%.

5. The refractory material according to claim 1, wherein the molten metal is aluminium.

6. An article for the transfer of molten metal having an affinity relative to oxygen greater than that of silica, said article having at least a molten metal contacting surface made from a refractory material comprising vitreous silica and between about 0.1% and 10% by weight barium sulfate.

7. The article of claim 6, wherein the molten metal contacting refractory surface has a thickness of more than 2 mm.

* * * * *